US012103298B2

(12) United States Patent
Garbsch et al.

(10) Patent No.: US 12,103,298 B2
(45) Date of Patent: Oct. 1, 2024

(54) PRINTING SYSTEM AND METHOD FOR ADJUSTING AN INK RECIPE OF A PRINTING SYSTEM

(71) Applicant: BOBST BIELEFELD GMBH, Bielefeld (DE)

(72) Inventors: Andreas Garbsch, Bad Salzuflen (DE); Heiner Vedder, Bielefeld (DE)

(73) Assignee: BOBST BIELEFELD GMBH, Bielefeld (DE)

( * ) Notice: Subject to any disclaimer, the term of this patent is extended or adjusted under 35 U.S.C. 154(b) by 119 days.

(21) Appl. No.: 17/595,415

(22) PCT Filed: May 7, 2020

(86) PCT No.: PCT/EP2020/062763
§ 371 (c)(1),
(2) Date: Nov. 16, 2021

(87) PCT Pub. No.: WO2020/234003
PCT Pub. Date: Nov. 26, 2020

(65) Prior Publication Data

US 2022/0203697 A1 Jun. 30, 2022

(30) Foreign Application Priority Data

May 20, 2019 (EP) .................................... 19020335

(51) Int. Cl.
*B41F 33/00* (2006.01)

(52) U.S. Cl.
CPC ................................ *B41F 33/0045* (2013.01)

(58) Field of Classification Search
CPC .................................................. B41F 33/0045
See application file for complete search history.

(56) References Cited

U.S. PATENT DOCUMENTS

2004/0182262 A1* 9/2004 Seymour .............. H04N 1/6052 101/211
2011/0035040 A1 2/2011 Ihme et al.

FOREIGN PATENT DOCUMENTS

CN 1856000 A 11/2006
CN 101939167 A 1/2011
(Continued)

OTHER PUBLICATIONS

International Search Report issued Jul. 22, 2020 in International Application No. PCT/EP2020/062763.

*Primary Examiner* — Matthew G Marini
*Assistant Examiner* — Leo T Hinze
(74) *Attorney, Agent, or Firm* — Bookoff McAndrews, PLLC

(57) ABSTRACT

A printing system for printing on a material has an ink formulation module (18) for providing an ink recipe, a printing unit (12), a sensor for generating color measurement data (CMD), and a control module (16) being connected to the sensor (14) and to the printing unit (12). The color measurement data (CMD) comprises at least one actual ink color value and the control module (16) is configured to receive at least one unit parameter (UP) from the printing unit (12), to receive the color measurement data (CMD) from the sensor (14) and to transmit the at least one unit parameter (UP) and the color measurement data (CMD) to the ink formulation module (18). Moreover, the ink formulation module (18) is configured to create at least one adjusted recipe (AR). Furthermore, a method for adjusting an ink recipe of a printing system (10) is provided.

20 Claims, 1 Drawing Sheet

(56) References Cited

FOREIGN PATENT DOCUMENTS

Figure 1:
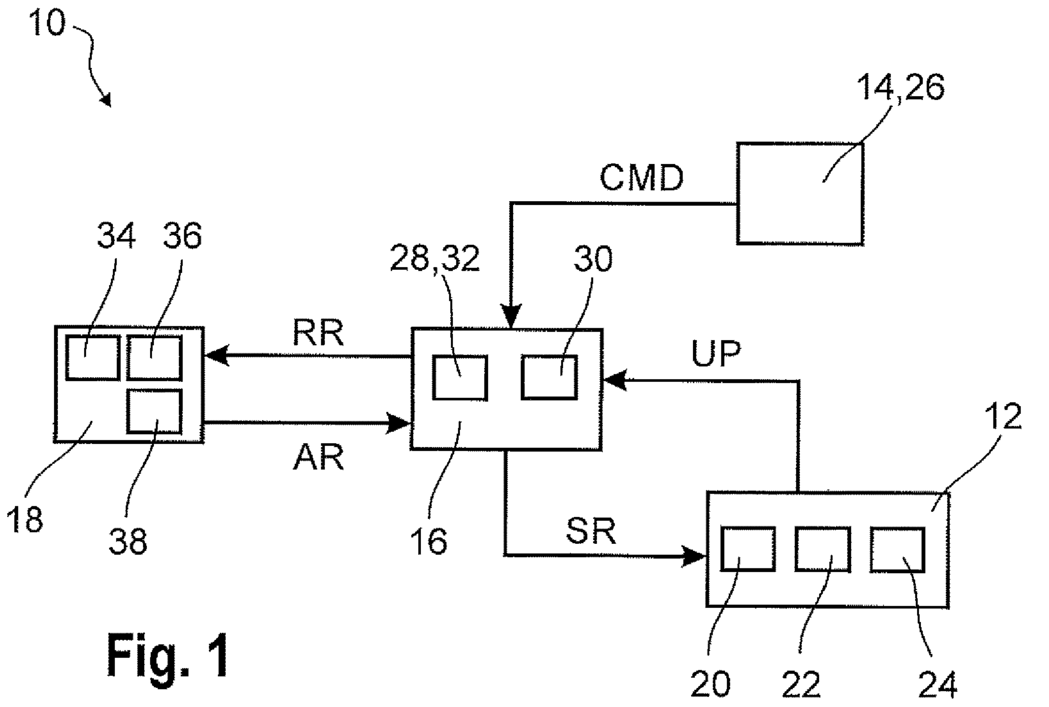

| | | | | | |
|---|---|---|---|---|---|
| CN | 102123867 | A | | 7/2011 | |
| EP | 2219869 | B1 | | 7/2011 | |
| EP | 3078495 | A1 | * | 10/2016 | ............. B41F 31/02 |
| WO | 2017174219 | A1 | | 10/2017 | |

* cited by examiner

PRINTING SYSTEM AND METHOD FOR ADJUSTING AN INK RECIPE OF A PRINTING SYSTEM

CROSS-REFERENCE TO RELATED APPLICATION(S)

This application is a National Stage under 35 U.S.C. § 371 of International Application No. PCT/EP2020/062763, filed May 7, 2020, which claims priority to European Patent Application No. 19020335.6, filed May 20, 2019, the contents of all of which are incorporated by reference in their entirety.

The invention relates to a printing system and a method for adjusting an ink recipe of a printing system.

To guarantee a high printing quality it is necessary that the printed product is checked with regard to its color accuracy.

For this purpose, it is known to use sensors to measure the spectral wavelength distribution and the spectral intensity and to compare these measured values to target values.

Based on this comparison, an adjusted ink recipe is provided. Known systems able to provide an adjusted ink recipe are usually, however, complex to operate and require many operating steps so that several iterations are necessary to achieve the desired printing result.

Therefore, it is the object of the invention to provide a printing system and a method for adjusting an ink recipe of a printing system that simplifies the color adjustment process.

In order to achieve this object, a printing system is provided for printing on a material, in particular paper, cardboard, foil, aluminum or fabric, comprising an ink formulation module for providing an ink recipe, a printing unit for applying ink to the material, a sensor for generating color measurement data, and a control module being connected to the sensor and to the printing unit. The color measurement data comprises at least one actual ink color value of the ink applied to the material by the printing unit. The control module is configured to receive at least one unit parameter from the printing unit, to receive the color measurement data from the sensor and to transmit the at least one unit parameter and at least parts of, in particular the full color measurement data as a recipe request to the ink formulation module. The ink formulation module is configured to create at least one adjusted recipe based on the recipe request.

The invention is based on the idea to provide a printing system with a control module which is connected to a sensor providing the at least one actual ink color value and which is connected to the printing unit applying the ink to the material. Therefore, unit parameters as well as printing quality related parameters of the printing process, i.e. the at least one actual ink color value, are controlled and/or monitored by the control module. In the case that the printing quality does not fulfill a predetermined level, the control module is configured to transmit a recipe request to an ink formulation module. Based on the recipe request, the ink formulation module is configured to create at least one adjusted ink recipe. Therefore, the printing system simplifies the color adjustment process by controlling and/or monitoring unit parameters and printing quality related parameters and by generating ink recipe requests in case that the printing quality does not fulfill a predetermined quality.

Ink is understood previously and in the following to mean a composition of different base colors. These different base colors are mixed together and result in the ink that is applied to the material. It goes without saying that the mixture of different base colors results again in a new color having color specific properties, for instance a color value.

In one embodiment of the invention the sensor comprises a camera, a spectral photometer, a densitometer, and/or a photodiode with corresponding color filters, which measures the color measurement data from the applied ink on the material according to the ink recipe. This means that common solutions for the color measurement data can be applied, thereby reducing the costs for monitoring the printing quality.

For instance, the color measurement data comprises the actual ink color value, an actual ink application value, an actual ink acceptance value of the material, an actual dot size on the printed material, an actual ink layer thickness, and/or an actual absorbency value of the material.

In general, it is conceivable that the printing system has several sensors measuring different of the aforementioned values. By measuring more than one value indicative of the quality of the printing process, an accurate monitoring of the printing quality is provided.

The sensor measures one or more of the mentioned properties of the ink applied to the material and generate color measurement data based on the measurements. It is of course possible that the color measurement data comprises the measurement values directly.

The printing system may comprise a display configured for displaying ink recipes. This way a simple interface is created for providing information to an operator of the printing system.

For instance, the control module and/or the ink formulation module is configured to transmit data to the display. The data may be the actual ink color value, the at least one unit parameter, the ink recipe request, and/or the adjusted ink recipe.

For ease adjustment of the printing unit, the ink formulation module may provide at least one recipe template with a template identifier, wherein the control module is configured to transmit the template identifier of the template to be used as part of the recipe request to the ink formulation.

For instance, the template may comprise a maximum number of applicable colors of the printing unit and/or applicable color types. Therefore, the template may provide boundary conditions for the adjusted recipe.

In order to estimate the quality of the adjusted ink recipe more accurately, the recipe request may comprise also request information. The request information may be a number of recipes to be calculated and/or the template identifier.

Additionally or alternatively the at least one unit parameter may comprise an identifier, in particular an identification number, of the printing unit, an identifier, in particular an identification number, of a component of the printing unit, in particular of a printing roller or an anilox roller, a rotating speed of the printing roller or the anilox roller, gravure information of the printing roller or the anilox roller, and/or a processing speed of the printing unit.

The gravure information may comprise a gravure type (line, obtuse pyramid, hexagonal shape), a number of cells in a certain volume, a gravure depth, and/or an angle, for instance of the cells.

To provide reference values for the quality, the ink formulation module may be configured to create additional recipe information and to transmit the additional recipe information to the control module.

The additional recipe information may have a recipe identifier, like an identification number, and/or color target data.

For example, the ink formulation module may provide target values for at least one, in particular each, of the measured values of the sensor, i.e. for each of the values of the color measurement data.

For instance, the color target data comprises a target ink color value, a target ink application value, a target ink acceptance value of the material, a target dot size on the printed material, a target ink layer thickness, and/or a target absorbency value of the material.

To facilitate the ink mixing at the printing unit, the ink recipe provided by the ink formulation module may comprise a number of colors, an identifier, and/or quantities of the colors to be mixed. The quantities of the colors may be expressed in relative or in absolute numbers and/or given as volume information or weight information.

The ink formulation module is for instance a color kitchen providing the color target data.

To monitor the print quality of the print unit accurately, the printing system may comprise a color measurement module. The color measurement module may be connected to the control module for transmitting color information to the control module, wherein the control module is configured to include at least parts, in particular the whole color information in the recipe request.

For instance, the color measurement module is connected to the sensor and is configured to receive the color measurement data from the sensor and to transmit the color measurement data to the control module as part of the color information.

Alternatively or additionally, the color measurement module may be connected to the printing unit and may be configured to receive at least one process parameter from the printing unit and to transmit the at least one process parameter to the control module as part of the color information. Hence, the color measurement module provides additional information to evaluate the printing quality.

Furthermore, the color measurement module may comprise the color target data and may be configured to transmit the color target data to the control module as part of the color information.

In one embodiment of the invention, the process parameter may be the type of the material, a composition of the material, an absorbency factor of the material, and/or a material used in a printing roller and/or anilox roller of the printing unit. Therefore, a more accurate prediction of the color authenticity of the ink recipe is provided.

The material composition is for instance the roughness of a surface of the material.

To facilitate the mixing process the different base colors used in the adjusted ink, the printing system may comprise an ink scale, the ink scale being connected to the printing unit and/or the control module, particularly wherein the ink scale is configured to receive and/or display an ink recipe.

The printing system may comprise a database, the database being accessible by and/or stored in the control module and/or in the ink formulation module, particularly wherein information on a manufacturer's color range, an available color range and/or color mixing information is stored in the database. Hence, data can easily be shared among the different modules of the printing system.

In general, it is conceivable that the color measurement module is connected to the database as well.

The object of the invention is solved further by a method for adjusting an ink recipe of a printing system, wherein the printing system may comprise a printing unit, a sensor, a control module, and an ink formulation module, the method having the following steps:

a) applying ink to the material by the printing unit, wherein the applied ink corresponds to an ink recipe,
b) measuring, by the sensor, at least one actual ink color value of the ink applied to the material,
c) receiving by the control module the at least one actual ink color value and at least one unit parameter of the printing unit,
d) transferring of the at least one actual ink color value and the at least one unit parameter of the printing unit as a recipe request to the ink formulation module by the control module, and
e) adjusting the ink recipe by the ink formulation module based on the recipe request creating at least one adjusted ink recipe.

The idea of the invention is to create a recipe request based on at least one unit parameter and color measurement data, i.e. the at least one actual ink color value, which are accessible by the control module. Subsequently, the ink formulation module adjusts the ink recipe to improve the printing quality. Hence, it is possible to adjust the ink recipe using data which is accessible for the control module. Therefore, the invention provides a simple and efficient way for the color adjustment process.

In general, it is conceivable that the ink formulation module transfers the adjusted ink recipe directly to the printing unit such that a fast adjustment of the ink recipe used at the printing unit can be done, reducing the time the printing unit stands still and/or does not produce a printed material with sufficient quality.

To enhance the efficiency of the printing system further, the method may comprise the following further steps:

a) transmitting the at least one adjusted ink recipe by the ink formulation module to the control module, and
b) optionally selecting one of the at least one adjusted ink recipe, in particular by the control module, and transferring the selected adjusted ink recipe to the printing unit, an ink scale of the printing system and/or an automatic ink mixing unit of the printing system.

By providing more than one adjusted ink recipe, the printing quality can be enhanced further by finding the optimum ink recipe.

The selection of one adjusted ink recipe may be done automatically by the control module, e.g. based on a characteristic value, or manually by an operator of the printing system.

In order to provide a simple ink selection process for the operator, the at least one adjusted ink recipe may be displayed on a display of the printing system.

Hence, the operator of the printing system may select an adjusted ink recipe from the ink recipes displayed, for instance by pressing onto an area of a touch-sensitive display indicative for a specific adjusted ink recipe. It is also conceivable that the operator moves a cursor to that area and provides an input indicative for using a specific ink recipe.

In general, it is conceivable that the ink formulation module provides the adjusted ink recipe directly to the printing unit. This facilitates the color adjustment process even further.

In one embodiment of the invention, the selected ink recipe is transferred to an ink scale of the printing system, in particular by the control module. Hence, the printing system provides an automated system for adjusting the ink recipe at the printing unit.

For instance, a display of the ink scale may display the selected ink recipe. This provides a possibility to monitor the used ink in the printing unit.

It is conceivable that the operator of the printing system mixes the ink for the printing unit according to the ink recipe shown on the display of the ink scale.

Alternatively, it is conceivable that the ink scale mixes the ink for the printing unit automatically and/or that the control module provides mixing commands to a ink mixing unit of the printing unit.

To estimate the adjusted printed quality resulting from the adjusted ink recipe, the ink formulation module may determine a characteristic parameter, in particular a simulated ΔE value, for each adjusted ink recipe, wherein the characteristic parameter is transferred to the control unit by the ink formulation module as part of the additional recipe information together with the corresponding adjusted ink recipe. The characteristic parameter serves as a selection criterion for the operator or the control module.

The ΔE value describes the distance in color space between two colors, as defined in DIN EN ISO 11664-4.

In case the color value of the ink is described by the coordinates hue (h), saturation (s) and value (v), the distance between a current color value $C_c$ characterized by current coordinates $h_c$, $s_c$, and $v_c$ and a target color value $C_t(h_t,s_t,v_t)$ is given by the Euclidean distance in the coordinate space:

$$\Delta E = \sqrt{(h_c - h_t)^2 + (s_c - s_t)^2 + (v_c - v_t)^2}.$$

Hence, a value of ΔE=0 means that the distance in coordinate space between current color and target color is zero implying that the current color is the target color.

Since a value of ΔE=0 is a theoretical value and not achievable in the printing process, a value ΔE<1 is desirable for the printing quality.

The ink formulation module provides the simulated ΔE value, e.g. based on experience values from previous ink recipes and/or simulations.

For this purpose, the ink formulation module may simulate the estimated current color based on the at least one unit parameter, the process parameter and/or the adjusted recipe.

In one embodiment of the invention, the color measurement module may transmit color information to the control module, wherein the control module includes at least parts, in particular the whole color information in the recipe request.

For instance, the color measurement module receives color measurement data from the sensor and transmits the color measurement data to the control module as part of the color information, particularly wherein the color measurement data comprises the actual ink color value, an actual ink application value and/or an actual ink layer thickness.

Additionally or alternatively, the color measurement module may receive at least one process parameter from the printing unit and transmits the at least one process parameter to the control module as part of the color information.

The color measurement module may comprise also color target data and may transmit the color target data to the control module as part of the color information, in particular wherein the color target data comprises a target ink color value, a target ink application value, and/or a target ink layer thickness. Hence, the color measurement module has detailed information about the desired printing quality.

Furthermore, the color measurement module may provide a quality parameter, in particular an actual ΔE value, for characterizing the quality of the printing process and may transmit the quality parameter to the control module as part of the color information. This quality parameter is useful for the evaluation of the current printing quality.

For providing a secure and fast data exchange, the unit parameter, the process parameter, the recipe request, the recipe, the recipe information, the color measurement data, the color target data, and/or the color information may be exchanged between the control module, the ink formulation module, the printing unit, the ink scale and/or the color measurement module via a local area network, a wireless interface, in particular via a wireless network and/or a Bluetooth connection, and/or a shared folder on a non-volatile memory.

The aforementioned printing system uses in particular the aforementioned method for adjusting an ink recipe.

Figure 2:
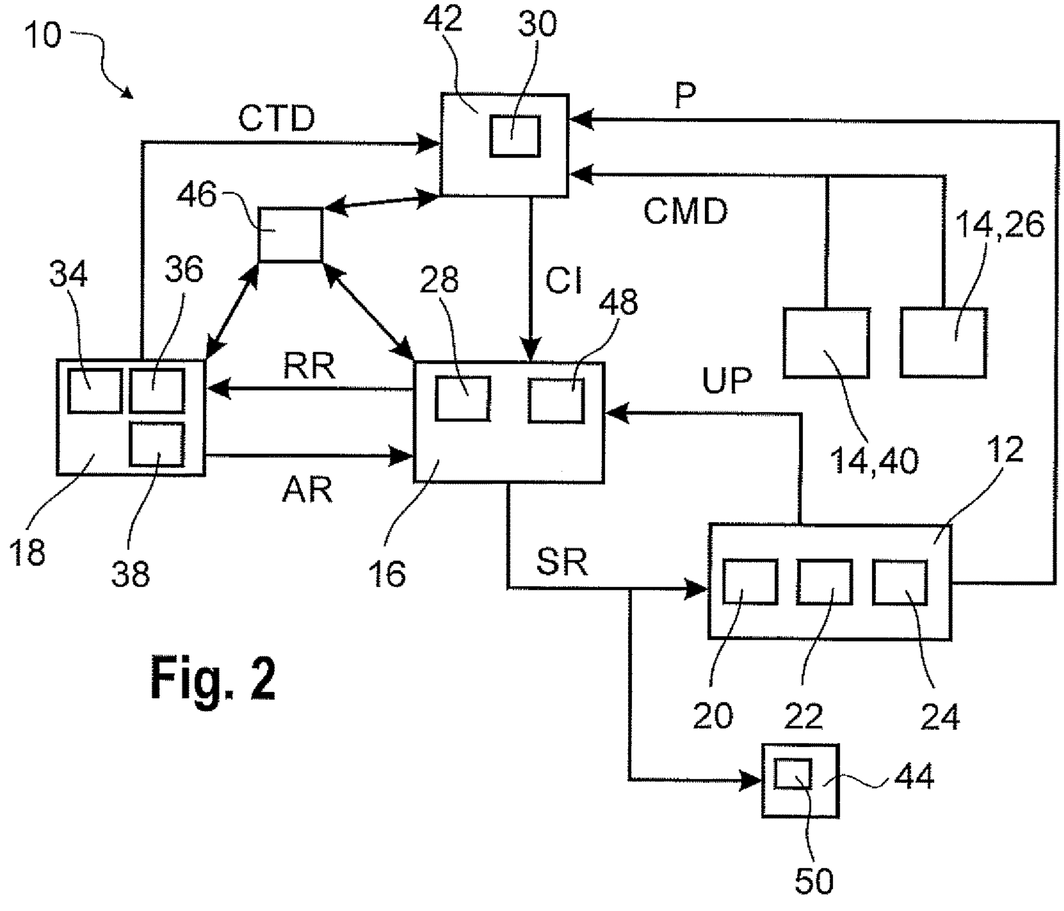

Further features and advantages of the invention will be apparent from the following description of two embodiments with the aid of the enclosed drawings, in which:

FIG. 1 shows a block diagram of a first embodiment of a printing system according to the invention, and FIG. 2 shows a block diagram of a second embodiment of a printing system according to the invention.

FIG. 1 shows a printing system 10 with a printing unit 12, a sensor 14, a control module 16, and an ink formulation module 18.

In FIG. 1, the printing unit 12 is a flexographic printing unit comprising an ink tray 20, an anilox roller 22, and a printing roller 24.

In general, the printing unit 12 may also be an intaglio-printing unit.

The printing unit 12 is configured to receive a selected ink recipe SR from and to provide at least one unit parameter UP to the control module 16.

The ink tray 20 provides an ink reservoir for ink, the ink within the ink tray 20 being mixed according to an ink recipe.

For instance, the ink in ink tray 20 can be provided by an ink kitchen mixing the ink recipe.

The anilox roller 22 takes up the ink from the ink tray 20 through a rotational movement and transfers the ink to the printing roller 24 in a known manner.

The unit parameter UP is an identifier, like an identification number, of the printing unit 12, an ink level in the ink tray 20, an identifier, like an identification number, indicating the ink filled into the ink tray 20, an identifier, like an identification number, of the anilox roller 22, a rotating speed of the anilox roller 22, specific information related to the anilox roller 22, as the gravure information of the anilox roller 22, an identifier, like an identification number, of the printing roller 24, a rotating speed of the printing roller 24, specific information related to the printing roller 24, as the gravure of the printing roller 24, and/or a processing speed of printing unit 12.

It has to be understood that FIG. 1 is only illustrative in nature and that there are typically several ink trays 20, anilox rollers 22, and printing rollers 24 used in the printing unit 12, e.g. for each ink applied to the material. For simplicity, it assumed that there is only one ink tray 20, one anilox roller 22, and one printing roller 24 in the printing unit of FIG. 1.

The sensor 14 is configured to provide color measurement data CMD based on the application of the ink onto the material.

The sensor 14 is for instance a spectral photometer 26 measuring at least one actual ink color value of the printed material. The measured actual ink color value is used as a part of the color measurement data CMD.

The actual ink color value is, for example, a vector in a color space, as the HSL (hue, saturation, lightness) color space, the HSV (hue, saturation, value) color space, the HSI (hue, saturation, intensity) color space, the HSB (hue, saturation, brightness) color space, or the RGB (red, green, blue) color space.

The control module 16 has a display 28 and a quality evaluation module 30 and is connected to the printing unit 12 as well as to the sensor 14.

Furthermore, the control module 16 is configured to control the printing unit 12 meaning that the control module 16 is configured to provide commands, e.g. the selected ink recipe SR, that are transmitted to the printing unit 12, to provide a recipe request RR and to receive an adjusted ink recipe AR.

More precisely, the control module 16 can transmit commands to the components of the printing unit 12, i.e. the ink tray 20, the anilox roller 22, and the printing roller 24. Hence, the control module 16 may control the at least one unit parameter UP, in particular all of the unit parameter UP, of the printing unit 12.

The display 28 is configured to display information of the printing system 10; for instance, the color measurement data CMD, the at least one unit parameter UP, and/or an ink recipe, e.g. the selected ink recipe SR.

In FIG. 1, the display 28 is an input display 32 such that an operator of the printing system 10 may interact with the printing system 10, in particular with the control module 16.

More precisely, the operator of the printing system 10 can provide a touch-input through the display 32 or an input by selecting an ink recipe by means of a cursor.

The quality evaluation module 30 of the control module 16 is configured to evaluate the quality of the printing process with a quality parameter.

In particular, the quality evaluation module 30 is configured to evaluate the color measurement data provided by the sensor 14.

For instance, the quality evaluation module 30 may comprise color target data CTD providing target values for the color measurement data CMD such that the calculated quality parameter is based on a comparison of the color measurement data CMD to the color target data CTD.

In particular, the color target data CTD comprises at least one target ink color value such that the quality parameter is the ΔE value of the printing process, i.e. the Euclidean distance between the target ink color value and the actual ink color value in the color space.

The color target data CTD may be provided by the sensor 14, e.g. by providing color measurement data CMD for a reference print, and/or by the control module 16.

The recipe request RR created by the control module 16 comprises request information, for example the number of ink recipes to be calculated and/or the color target data CTD.

In general, the recipe request RR may comprise a single unit parameter UP, a selection of certain unit parameters UP or comprise all unit parameters UP.

The ink formulation module 18 comprises a template module 34, an ink recipe generation module 36, a recipe evaluation module 38, and a layer thickness calculation module 39.

The template module 34 provides templates with a template identifier, like an identification number. The templates specify the ink generation procedure of the ink recipe generation module 36.

The template may comprise printing unit 12 related boundary parameters.

The ink recipe generation module 36 is configured to provide ink recipes, the ink recipe comprising a number of colors to be used, an identification number, and/or quantities of the colors to be mixed.

For instance, the ink recipe generation module 36 provides a correction recipe, i.e. an ink recipe for an ink to be added to the ink of the ink tray 20.

Hence, the ink recipe is an instruction to mix the ink for the printing unit 12 with detailed information and quantities about the colors to be mixed.

To provide boundary conditions for the ink recipes, the ink recipe generation module 36 may use one of the templates from the template module 34.

Additionally, the ink recipe generation module 36 provides additional recipe information, for example a recipe identifier, like an identification number, and the color target data CTD.

The recipe evaluation module 38 is configured to evaluate the ink recipe generated by the ink recipe generation module 36, in particular to provide an estimated quality value for the ink recipe, as for example a simulated ΔE value.

The layer thickness calculation module 39 is adapted to provide a target layer thickness for the ink recipe generated by the ink recipe generation module 36.

In the following, the method for providing an adjusted ink recipe AR is described using FIG. 1.

In FIGS. 1 and 2, the data transfer is illustrated by arrows.

This data transfer is realized, for instance, through a local area network, a wireless interface, in particular via a wireless network, a Bluetooth connection, a shared folder on a non-volatile memory, or a combination thereof.

As a first step, the printing unit 12 applies ink to the material according to the ink recipe provided by the ink kitchen, the control module 16, and/or the ink formulation module 18.

After the printing process, i.e. after the application of the ink onto the material, and/or during the printing process, the sensor 14 is measuring the ink application of the printing unit 12 onto the material. Particularly, the sensor 14 is providing at least one actual ink color value as part of the color measurement data CMD and transmits the color measurement data CMD to the control module 16.

The control module 16 receives the color measurement data CMD, in particular the at least one actual ink color value, from the sensor 14 and at least one unit parameter UP from the printing unit 12.

Subsequently, the control module 16 shows the color measurement data CMD and/or the at least one unit parameter UP on the display 28.

The control module 16 evaluates the color measurement data CMD using the quality evaluation module 30. The quality evaluation module 30 provides the quality parameter of the printing process. The quality parameter may be shown also on the display 28.

The operator of the printing system 10 monitors, for instance, the quality parameter and recognizes that the quality parameter is not within a predetermined range. In this case, the operator interacts with the control module 16 via the display 32. Based on the input of the operator, the control module 16 generates a recipe request RR that is transferred to the ink formulation module 18.

In general, it is conceivable that the control module 16 provides the recipe request RR and transfers it to the ink formulation module 18 automatically, i.e. without the touch-input of the operator of the printing system 10.

In particular, the control module 16 provides the recipe request RR in case that the quality parameter indicates that the quality of the printing process does not fulfill certain predetermined values and/or is not within a certain range.

For instance, the control module 16 provides a recipe request RR to the ink formulation module 18 in case that the actual ΔE value is greater 1.

Subsequently, the ink formulation module 18 generates at least one adjusted ink recipe AR, e.g. based on a template from the template module 34 and the additional request information.

More precisely, the ink recipe generation module 36 uses the template identifier of the request information provided by the recipe request RR of the control module 16 to pick a respective template. The template defines the boundary condition for the adjusted ink recipe AR.

In the following, it is assumed that the ink formulation module 18 provides two adjusted ink recipes AR. Of course, the ink formulation module may provide only one or more than two adjusted recipes AR.

In particular, the two different adjusted ink recipes AR comprise different base colors, a different number of colors, and/or different quantities of the colors to be mixed.

For instance, the first ink recipe has four colors (magenta, yellow, cyan, and black) with a composition of 70%, 11%, 15%, and 7%. The second ink recipe has three colors (magenta, yellow, cyan) with a composition of 80%, 10%, and 10%.

Furthermore, the characteristic parameter, e.g. the simulated ΔE value, is calculated for each adjusted ink recipe using the request information of the recipe request RR from the control module 16.

Referring to the above-mentioned example, the simulated ΔE value is, for instance, 0.9 for the first adjusted ink recipe and 1.5 for the second adjusted ink recipe.

Subsequently, the adjusted ink recipes AR as well as the recipe information comprising the characteristic parameters are transferred to the control module 16.

The control module 16 controls the display 32 to display, for example, the adjusted ink recipes AR and the respective recipe information, like the color composition of each ink recipe together with the simulated ΔE value.

The operator of the printing system 10 then selects one of the different adjusted ink recipes AR which becomes the selected ink recipe SR. For example, the operator selects the adjusted ink recipe AR with the smallest simulated ΔE value.

For instance, the operator selects one adjusted ink recipe AR by selecting a certain area on the display, e.g. a button with a mouse cursor, providing thereby an input signal to the control module 16. Based on the input signal, the control module 16 sends the corresponding selected ink recipe SR to the printing unit 12 such that the ink recipe used to apply the ink onto the material is adapted.

In particular, the selected ink recipe SR provides an ink recipe for an ink to be added to the ink of ink tray 20 such that the selected ink recipe SR is a color correction recipe.

In general, it is conceivable that the adjusted ink recipes AR provided by the ink formulation module 18 provides the ink recipe for the ink to be added to the ink of ink tray 20 or that the control module 16 calculates the ink recipe for the ink to be added to the ink tray 20 based on the actual ink in the ink tray 20 and the selected ink recipe SR.

Hence, the color composition of the ink in the ink tray 20 may be adapted by adding the ink according to the selected ink recipe SR provided to the printing unit 12.

In general, it is conceivable that the ink recipe provides additionally new unit parameters UP, e.g. a new processing speed for the printing unit 12, a new rotating speed for the anilox roller 22 and/or the printing roller 24.

Furthermore, the aforementioned method may be repeated until the quality parameter is satisfying, e.g. within the pre-determined range.

For example, the method may be repeated until the actual ΔE value is below 1.

In FIG. 2, a second embodiment of the printing system 10 is shown in a similar block diagram as in FIG. 1. The printing system 10 of FIG. 2 essentially corresponds to the printing system 10 of FIG. 1 so that only the differences between the first and the second embodiment will be discussed in the following. Identical and functionally identical components are provided with the same reference signs.

Compared to the printing system 10 of FIG. 1, the printing system 10 of FIG. 2 comprises additionally a densitometer 40 as part of the sensor 14, a color measurement module 42, an ink scale 44, and a database 46.

The densitometer 40 measures an actual layer thickness and an actual ink application value of the ink applied onto the material as part of the color measurement data CMD. Hence, the color measurement data CMD of FIG. 2 comprises the actual ink color value, the actual layer thickness, and the actual ink application value.

In FIG. 2, the color measurement data CMD is transferred to the color measurement module 42 that is connected to the sensor 14.

The color measurement module 42 is configured to evaluate the quality of printing process of printing unit 12. For this purpose, the color measurement module 42 comprises the quality evaluation module 30 and provides, thus, the quality parameter.

The color measurement module 42 is connected to the ink formulation module 18 and is configured to receive the color target data CTD from the ink formulation module 18 such that the quality evaluation module 30 compares the color target data CTD to the color measurement data CMD.

In general, it is conceivable that the color measurement module 42 receives the color target data CTD from the database 46 and/or from the sensors 14 providing color measurement data CMD for a reference print such that the color measurement data is in this case the color target data CTD.

In FIG. 2, the color target data CTD comprises the target ink color value, a target layer thickness, and/or the target ink application value Additionally, the color measurement module 42 is connected to the printing unit 12 and receives at least one process parameter P from the printing unit 12. The process parameter P is for instance the type of the material used in the printing unit 12, a composition of the material, an absorbency factor of the material, and/or a material used in the printing roller 24 and/or the anilox roller 22 of the printing unit 12.

The color measurement module 42 is connected to the control module 16 and is configured to transmit color information CI, i.e. the color target data CTD, the color measurement data CMD, the process parameter P, and/or the quality parameter.

Similarly to the printing system 10 of FIG. 1, the control module 16 includes at least parts, in particular the whole color information CI in the recipe request RR sent to the ink formulation module 18.

In contrast to the first embodiment, the control module 16 of the second embodiment has a selection module 48 that controls the selection process of the selected ink recipe SR out of the at least one adjusted ink recipe AR provided by the ink formulation module 18.

In other words, the selected ink recipe SR is chosen by the selection module 48 and not by the operator of the printing system 10, e.g. by selecting the adjusted ink recipe with the smallest ΔE value.

In FIG. 2, the selected ink recipe SR is sent to the printing unit 12 as well as to the ink scale 44, having a display 50. The selected ink recipe SR is displayed on the display 50. By means of the ink scale 44, the different base colors of the ink used in ink tray 20 are mixed.

It is conceivable that the operator of the printing system 10 mixes the ink at the ink scale 44 such that the different components of the ink are displayed for the operator on the display 50.

Alternatively, an automatic ink mixing unit may be provided, e.g. at the ink scale 44, to mix the different base colors such that the display 50 is used, in this case, for monitoring purposes only.

The database 46 is connected to the color measurement module 42, the control module 16, and the ink formulation module 18. The database 46 comprises information on a manufacturer's color range, an available color range and/or color mixing information.

For instance, the database 46 provides information on the colors available to the ink formulation module 18 such that the ink formulation module 18 creates the adjusted ink recipes AR based on the colors available.

It goes without saying that the differences explained in the context of the second embodiment may individually or in an arbitrary combination also be present in the first embodiment.

The invention claimed is:

1. A printing system for printing on a material, the printing system comprising:

- an ink formulation module for creating multiple ink recipes,
- a printing unit for applying ink to the material,
- a sensor for generating color measurement data of the ink applied to the material during a printing process, and
- a control module connected to the sensor and to the printing unit,
- wherein the ink applied to the material is a composition of different base colors mixed together to form a new color having specific properties,
- wherein each of the multiple ink recipes is instructions to mix the ink for the printing unit, and each ink recipe includes colors to be mixed, an identification number, and/or quantities of the colors to be mixed,
- wherein the color measurement data comprises at least one actual ink color value of the ink applied to the material by the printing unit,
- wherein the control module is configured to receive at least one unit parameter from the printing unit, to receive the color measurement data from the sensor during the printing process, and to transmit the at least one unit parameter and at least parts of the color measurement data as a single recipe request to the ink formulation module,
- wherein the ink formulation module is configured to create the multiple ink recipes based on the single recipe request and transmit the multiple ink recipes to the control module, and
- wherein the control module automatically selects one of the multiple ink recipes for application of ink made with the selected ink recipe during the printing process, and wherein the automatic selection is based on at least one parameter associated with each of the multiple ink recipes.

2. The printing system according to claim 1, wherein the ink formulation module provides at least one recipe template with a template identifier, and

- wherein the control module is configured to transmit the template identifier of the at least one recipe template to be used as part of the recipe request to the ink formulation module.

3. The printing system according to claim 2,

- wherein the recipe request comprises request information, the request information being a number of recipes to be calculated and/or the template identifier; and/or
- wherein the at least one unit parameter comprises an identifier including an identification number of the printing unit, an identifier including an identification number of a component of the printing unit including a printing roller or an anilox roller, a rotating speed of the printing roller or the anilox roller, gravure information of the printing roller or the anilox roller, and/or a processing speed of the printing unit, and/or
- wherein the color measurement data comprises the actual ink color value, an actual ink application value and/or an actual ink layer thickness.

4. The printing system according to claim 1,

- wherein the ink formulation module is configured to create additional recipe information and to transmit the additional recipe information to the control module as part of the multiple ink recipes, and
- wherein the additional recipe information includes color target data comprising a target ink application value, a target ink layer thickness, and/or a target ink color value.

5. The printing system according to claim 4, wherein the printing system comprises a color measurement module, the color measurement module being connected to the control module for transmitting color information to the control module,

- wherein the color measurement module is connected to the sensor and is configured to receive the color measurement data from the sensor and to transmit the color measurement data to the control module as part of the color information, and/or
- wherein the color measurement module is connected to the printing unit and is configured to receive at least one process parameter from the printing unit and to transmit the at least one process parameter to the control module as part of the color information, and/or
- wherein the color measurement module comprises the color target data and is configured to transmit the color target data to the control module as part of the color information,
- wherein the control module is configured to include an entirety of the color information in the recipe request.

6. The printing system according to claim 1, wherein the printing system comprises an ink scale, the ink scale being connected to the printing unit and/or the control module, wherein the ink scale is configured to receive and/or display an ink recipe.

7. The printing system according to claim 1, wherein the printing system comprises a database, the database being accessible by and/or stored in the control module and/or in the ink formulation module, wherein information on a manufacturer's color range, an available color range and/or color mixing information is stored in the database.

8. The system of claim 1, wherein the parameter used to select one of the ink recipes from the multiple ink recipes is a ΔE value that is a Euclidean distance between a target ink color value and an actual ink color value in a color space and is determined by the ink formulation module.

9. The system of claim 8, wherein the ΔE value is based on experience values from one or more of previous ink recipes and simulations.

10. The printing system according to claim 1, wherein the at least one unit parameter comprises a rotating speed of a roller of the printing unit and/or a processing speed of the printing unit.

11. The printing system according to claim 1, wherein the selected ink recipe is a color correction recipe that provides ink to be added to an ink tray of the printing unit.

12. A method for adjusting an ink recipe of a printing system, the method comprising:

applying ink to a material by a printing unit, wherein the ink applied to the material is a composition of different base colors mixed together to form a new color having specific properties, and the applied ink corresponds to an ink recipe, the ink recipe being instructions to mix the ink the ink for the printing unit and includes colors to be mixed, an identification number, and/or quantities of the colors to be mixed, measuring, by a sensor, at least one actual ink color value of the ink applied to the material during a printing process, determining, by a quality evaluation module, a quality parameter of the printing process, receiving by a control module the at least one actual ink color value and at least one unit parameter of the printing unit, transferring of the at least one actual ink color value and the at least one unit parameter of the printing unit as a single recipe request to an ink formulation module by the control module, generating, by the ink formulation module, multiple ink recipes based on the single recipe request, transmitting the multiple ink recipe from the ink formulation module to the control module, wherein the control module automatically selects one of the multiple ink recipes for application of ink made according to the selected ink recipe during the printing process, and adjusting the ink recipe during the printing process by the ink formulation module according to the selected ink recipe, wherein the method is repeated until the quality parameter is within a predetermined range.

13. The method according to claim 12, wherein the method further comprises:

transferring the selected ink recipe to the printing unit, an ink scale of the printing system and/or an automatic ink mixing unit of the printing system.

14. The method according to claim 13, wherein the selected ink recipe is transferred to an ink scale of the printing system, by the control module, wherein a display of the ink scale displays the selected ink recipe.

15. The method according to claim 14, wherein a characteristic parameter, a simulated ΔE value that is a Euclidean distance between a target ink color value and an actual ink color value in a color space, is determined by the ink formulation module for each ink recipe, wherein the characteristic parameter is transmitted to the control unit as part of additional recipe information together with the corresponding recipe.

16. The method according to claim 15, wherein a color measurement module transmits color information to the control module, wherein the color measurement module receives color measurement data from the sensor and transmits the color measurement data to the control module as part of the color information, wherein the color measurement data comprises the actual ink color value, an actual ink application value and/or an actual ink layer thickness, and/or wherein the color measurement module receives at least one process parameter from the printing unit and transmits the at least one process parameter to the control module as part of the color information, and/or wherein the color measurement module comprises color target data and transmits the color target data to the control module as part of the color information, wherein the color target data comprises an target ink color value, a target ink application value, and/or a target ink layer thickness, wherein the control module includes an entirety of the color information in the recipe request.

17. The method according to claim 16, wherein the quality evaluation module is part of the color measurement module, the quality parameter is an actual ΔE value that is a Euclidean distance between a target ink color value and an actual ink color value in the color space, and the quality parameter is transmitted to the control module as part of the color information.

18. The method of claim 16, wherein the unit parameter, the process parameter, the recipe request, the ink recipe, the recipe information, the color measurement data, the color target data, and/or the color information are exchanged between the control module, the ink formulation module, the printing unit, the ink scale and/or the color measurement module via a local area network, a wireless interface, via a wireless network and/or a Bluetooth connection, and/or a shared folder on a non-volatile memory.

19. The method according to claim 12, wherein the quality parameter provided by the quality measurement module is an actual ΔE value that is a Euclidean distance between a target ink color value and an actual ink color value in a color space.

20. The method according to claim 19, wherein the method is repeated until the actual ΔE value is below 1.

* * * * *